US 9,239,686 B2

(12) United States Patent
Tsao

(10) Patent No.: US 9,239,686 B2
(45) Date of Patent: *Jan. 19, 2016

(54) METHOD AND APPARATUS FOR WIRELESS DEVICES ACCESS TO EXTERNAL STORAGE

(71) Applicant: Sheng Tai (Ted) Tsao, Fremont, CA (US)

(72) Inventor: Sheng Tai (Ted) Tsao, Fremont, CA (US)

(73) Assignee: Sheng Tai (Ted) Tsao, Fremont, CA (US)

( * ) Notice: Subject to any disclaimer, the term of this patent is extended or adjusted under 35 U.S.C. 154(b) by 179 days.

This patent is subject to a terminal disclaimer.

(21) Appl. No.: 14/036,744

(22) Filed: Sep. 25, 2013

(65) Prior Publication Data

US 2015/0089181 A1  Mar. 26, 2015

Related U.S. Application Data

(63) Continuation of application No. 10/726,897, filed on Dec. 4, 2003, now Pat. No. 8,606,880.

(51) Int. Cl.
   *G06F 13/00* (2006.01)
   *G06F 3/06* (2006.01)

(52) U.S. Cl.
   CPC ............ *G06F 3/0631* (2013.01); *G06F 3/0604* (2013.01); *G06F 3/067* (2013.01); *G06F 2003/0697* (2013.01)

(58) Field of Classification Search
   CPC ..... G06F 3/067; G06F 3/0604; G06F 3/0631; G06F 2003/0697
   USPC .......... 711/111, 114, 147, 171; 709/219, 226; 707/795, 802
   See application file for complete search history.

(56) References Cited

U.S. PATENT DOCUMENTS

| | | | | |
|---|---|---|---|---|
| 6,754,710 | B1* | 6/2004 | McAlear | 709/227 |
| 6,839,743 | B2* | 1/2005 | Shim | G06F 17/3089 707/E17.116 |
| 6,968,334 | B2* | 11/2005 | Salmenkaita et al. | 707/10 |
| 7,286,651 | B1* | 10/2007 | Packingham et al. | 379/88.14 |
| 7,707,065 | B1* | 4/2010 | Kangas | 705/26.1 |
| 8,059,818 | B2* | 11/2011 | Asokan et al. | 380/277 |
| 8,229,856 | B1* | 7/2012 | Reddick | G06Q 30/04 705/50 |
| 2002/0133597 | A1* | 9/2002 | Jhingan et al. | 709/228 |
| 2002/0173295 | A1* | 11/2002 | Nykanen et al. | 455/414 |
| 2003/0072031 | A1* | 4/2003 | Kuwata et al. | 358/1.15 |
| 2004/0176958 | A1* | 9/2004 | Salmenkaita et al. | 704/275 |
| 2004/0186750 | A1* | 9/2004 | Surbey et al. | 705/4 |
| 2005/0193199 | A1* | 9/2005 | Asokan et al. | 713/168 |
| 2006/0036610 | A1* | 2/2006 | Wang | 707/10 |
| 2006/0168123 | A1* | 7/2006 | Krstulich | H04L 63/083 709/219 |
| 2008/0059519 | A1* | 3/2008 | Grifftih | H04L 67/06 |
| 2008/0208870 | A1* | 8/2008 | Tsang | G06F 17/30165 |
| 2010/0211651 | A1* | 8/2010 | Guedalia et al. | 709/217 |
| 2010/0325709 | A1* | 12/2010 | Kawase | H04N 7/16 726/7 |
| 2012/0124370 | A1* | 5/2012 | Choi et al. | 713/159 |
| 2014/0208399 | A1* | 7/2014 | Ponzio, Jr. | 726/4 |

* cited by examiner

*Primary Examiner* — Reba I Elmore

(57) ABSTRACT

Traditionally, wireless device, such as cell phone or personal data assistant device (PDA), has relatively smaller storage capacity. Therefore, it is quite often that a user of the wireless device has difficulty to find more storage space for storing ever increased personal data, such as storing multiple Gig bytes of multimedia data including digital video, music, or photo picture etc. Instant application disclosed a system and method for a storage system providing storage service to the wireless device for the wireless device remotely storing personal data into an external storage space allocated exclusively to a user of the wireless device by the storage system.

20 Claims, 4 Drawing Sheets

Wireless devices supports in a simple environment

Wireless devices supports in a simple environment

METHOD AND APPARATUS FOR WIRELESS DEVICES ACCESS TO EXTERNAL STORAGE

CROSS REFERENCE TO PRIOR APPLICATION

This invention is a continuation application of the U.S. patent application Ser. No. 10/726,897 filed on Dec. 4, 2003 and now a U.S. Pat. No. 8,606,880. The application Ser. No. 10/726,897 had referenced to a prior application No. 60/401,238 of "Concurrent Web Based Multi-task Support for Control Management System" filed on Aug. 6, 2002 and converted to U.S. patent application Ser. No. 10/713,904 filed on Jul. 22, 2003 and now is an U.S. Pat. No. 7,418,702, and had also referenced to an prior application No. 60/402,626 of "IP Based Distributed Virtual SAN" filed on Aug. 12, 2002 and converted to U.S. patent application Ser. No. 10/713,905 filed on Jul. 22, 2003 and now is an U.S. Pat. No. 7,379,990. All mentioned prior applications are herein incorporated by reference in their entirety for all purpose.

FIELD OF THE INVENTION

This invention focuses on a wireless device accessing and using external storage space provided by a server.

BACKGROUND INFORMATION

Storage system always is a critical part of a computing system regardless of the computing system is a server, a laptop or desktop computer, or a wireless device such as cell phone or personal data assistant device ("PDA"). The storage system can be categorized as internal storage or external storage system.

The internal storages of a computing system include those storage media such as hard disk drives, memory sticks, and memory etc. that are internally connected in the computing system directly through system bus or a few inches of cable, Therefore, the storage media actually are internal components of the computing system in a same enclosure.

The external storage of a computing system are those storage media that are not the internal components of the computing system in a same enclosure. Therefore, the storage media have to be accessed through longer cable, such as through Ethernet controller with longer cable for IP based storage, Fiber channel cable for fiber channel storage, or wireless communication media etc. The storage media of the external storage could be magnetic hard disk drives, solid state disk, optical storage drives, memory card, etc. and could be in any form such as Raid which usually consists of a group of hard disk drives.

To effectively use a storage system, the storage devices of the storage system usually need to be partitioned with storage volumes. After the partition, each of the volumes can be used for establishing a file system on top of it. To simplify the discussion, herein, the term of the storage volume and its corresponding file system, and the storage partition are often used without differentiation.

To satisfy the needs for external storage for a larger number of wireless devices on the Internet, a central controlled distributed scalable virtual machine ("CCDSVM") of present invention can be deployed. The CCDSVM allows a control management system to control a group of computing systems for providing distributed services, including storage service, to client systems over the Internet, Intranet, and LAN environment.

As matter of the fact, today major Internet service provider (ISP) and application service provider (ASP) are all in business of providing various type of storage services to their clients.

Figure 1:
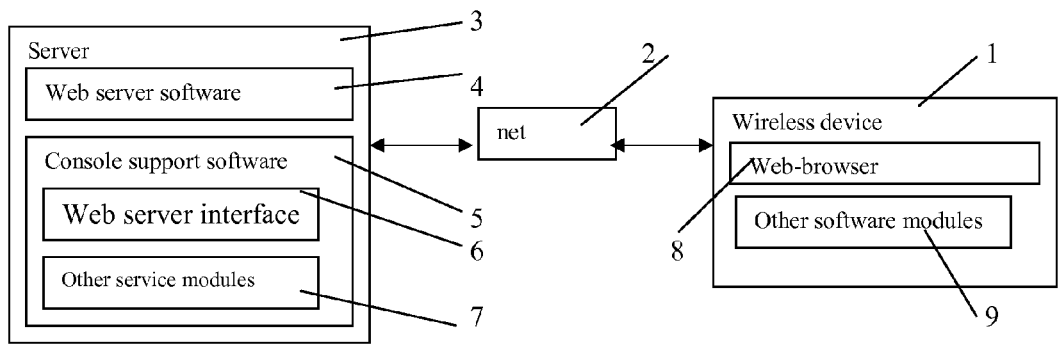
FIG. 1 illustrates an embodiment of the instant application. The FIG. 1 is the same as the FIG. 1 of a prior application of "Concurrent Web Based Multi-task Support for Control Management System" with an exception of a console host being replaced by a wireless device.

Unless specified, the programming languages and the protocols used by the software modules and the computing systems used of present invention are assumed to be the same as described in the prior patent applications.

In addition, in the drawing, like elements are designated by like reference numbers. Further, when a list of identical elements is present, only one element will be given the reference number.

BRIEF DESCRIPTION OF THE INVENTION

Today, users commonly face a problem of lack of storage capacity configured on their wireless devices such as cell phone or PDA, which are usually limited to 256 MB for the PDA and much less for the cell phone. To effectively solve this problem and let users possess multiple gigabytes (GB) of storage for their wireless devices as well as allowing the users to use the GB storage for their multimedia applications, the storage spaces provided by a server can be used as the external storage for the wireless devices. This technology has been briefly introduced in the prior patent applications.

Now let us examine how can the external storage actually be used by the wireless devices. First, facilitate each server unit (e.g. the server 3 of the FIG. 2) partition its storage system into volumes, such that each of the volumes will have multiple GB in size. Therefore, a user of each of the wireless devices can be exclusively assigned for access to a specific storage volume in the server unit. For example, if we need to provide each user a 4 GB storage space, then a 160 GB disk drive can support 40 users. Therefore, a 4096 GB storage system of the server unit can support a total of 1024 users. Further, any data on the wireless device of the user can be transmitted to an assigned storage volume in the server unit. In addition, the user of the wireless device also can download multimedia data from an ISP or ASP to the assigned storage volume in the server unit through out-band approach shown in FIG. 3. Finally, in one embodiment, the user can use a web-browser, which has a functionality of invoking embedded video or music, to enjoy his/her stored multimedia contents.

These and other futures, aspects and advantages of the present invention will become understood with reference to the following description, appended claims, and accompanying figures.

DETAILED DESCRIPTION OF THE DRAWINGS

Referring now to the FIG. 1, it demonstrates an example of a network infrastructure which includes a wireless device and a server. In the FIG. 1, Net (2) represents a communication link, which may be combined with wireless and wired connection media and guarantee that the communication packets can be sent/received between the wireless device and the server. It is also assumed that the net (2) in the network infrastructure is built up in such way that a user from a web browser on a wireless device can access and browse any web-site on the Internet, and Intranet.

In the FIG. 1, the console support software (5) of the server (3) can be configured to support web-based multitasking while a user on a wireless device (1) using a web browser (8). Further, the user of the wireless device is facilitated to perform creating structured layered file directories or folders, and perform data management operations, such as delete, move, copy, rename for data files or folders or directories etc. on an assigned storage volume controlled by the server (3).

In addition, the other software modules (9) of the wireless device (1) is also configured capable of to send data to or receive data from the other service modules (7) of the server (3) via communication link (2) through a suitable IP or non-IP based protocol. The data being sent or received cold be a digital photo picture, a message without limits.

Also, the console supporting software (5) of the server (3) and the other software modules (9) of the wireless device (1) can be implemented with any suitable languages such as C, C++, Java without limits.

Besides, the web-browser (8) of the wireless device (1) can be any suitable software, which. is capable to communication with web server software (4) on the server (3) or with any other web server through the HTTP protocol.

Figure 2:
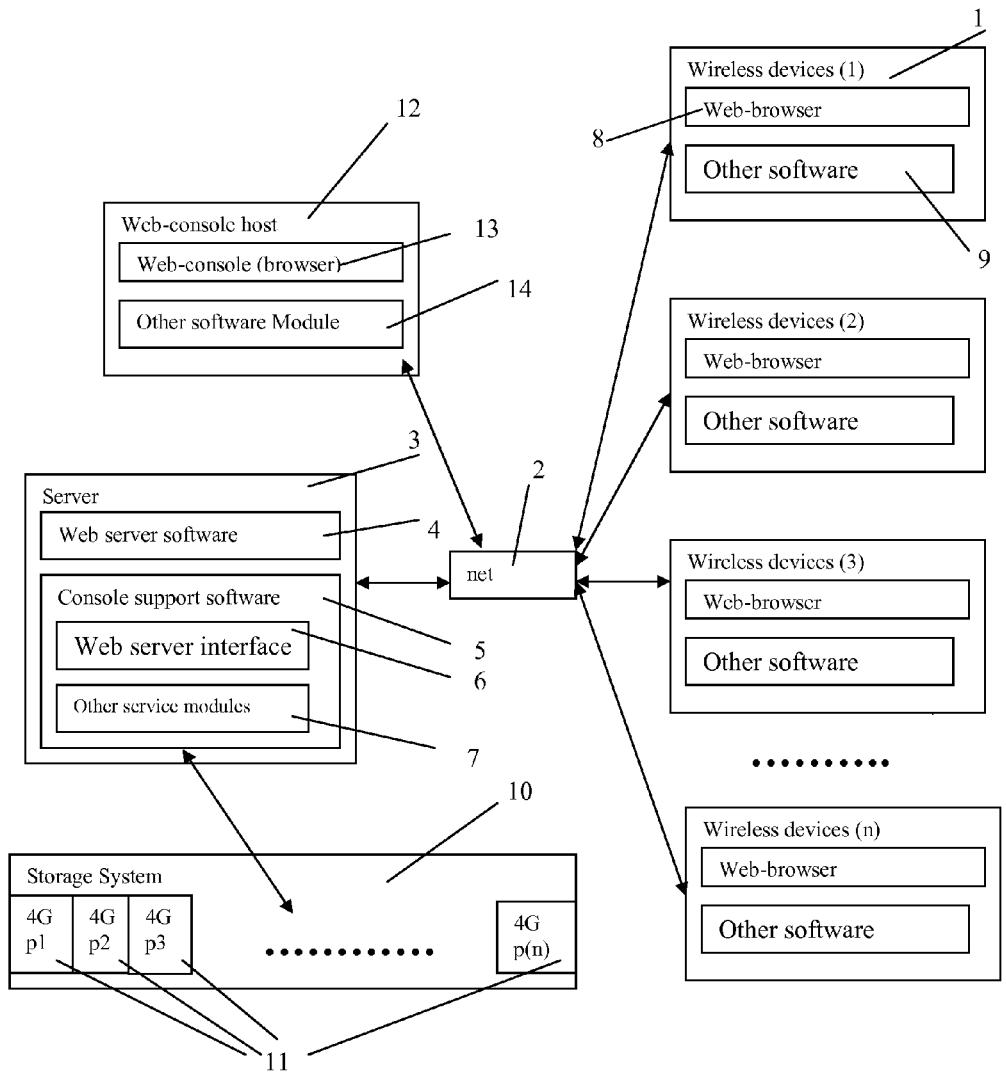
FIG. 2 is the same as the FIG. 1 of the above except that it illustrates an embodiment of a more detailed storage system controlled by a server. In addition, multiple wireless devices are presented for access to the storage system.

On the other hand, FIG. 2 has demonstrated the detailed storage system (10) of a server 3, where its storage volumes can be allocated to multiple wireless devices as followings: First, the storage system (10) of the server (3) can be partitioned into multiple storage volumes (11), for example, by administration staff through a web-console (13) of a console host (12).

Second, the storage system (10) of the server (3) can be partitioned in such way that a user of each of the wireless devices can be assigned with a storage volume having a desired size, so that the server 3 can support maximum numbers of the wireless devices.

In addition, the storage connection media could be any kind, such as SCSI cable, IP cable, Fiber cable etc. or could be wireless communication media. The storage system itself could be various types.

Finally, the storage system (10) can be accessed by each of the wireless devices through IP or non-IP based network and protocols.

Figure 3:
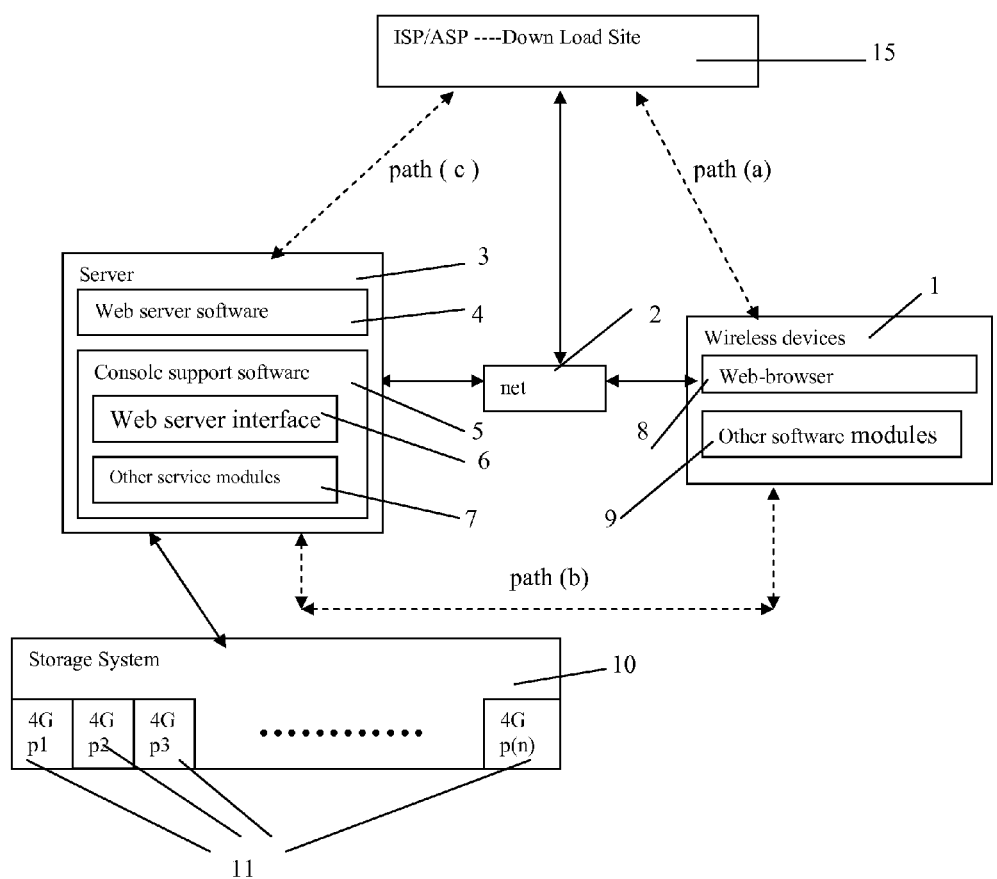
FIG. 3 shows a scheme of a wireless device downloading contents from an ISP/ASP or from other web sites to an external storage allocated for exclusive access by the wireless device.
Figure 4:
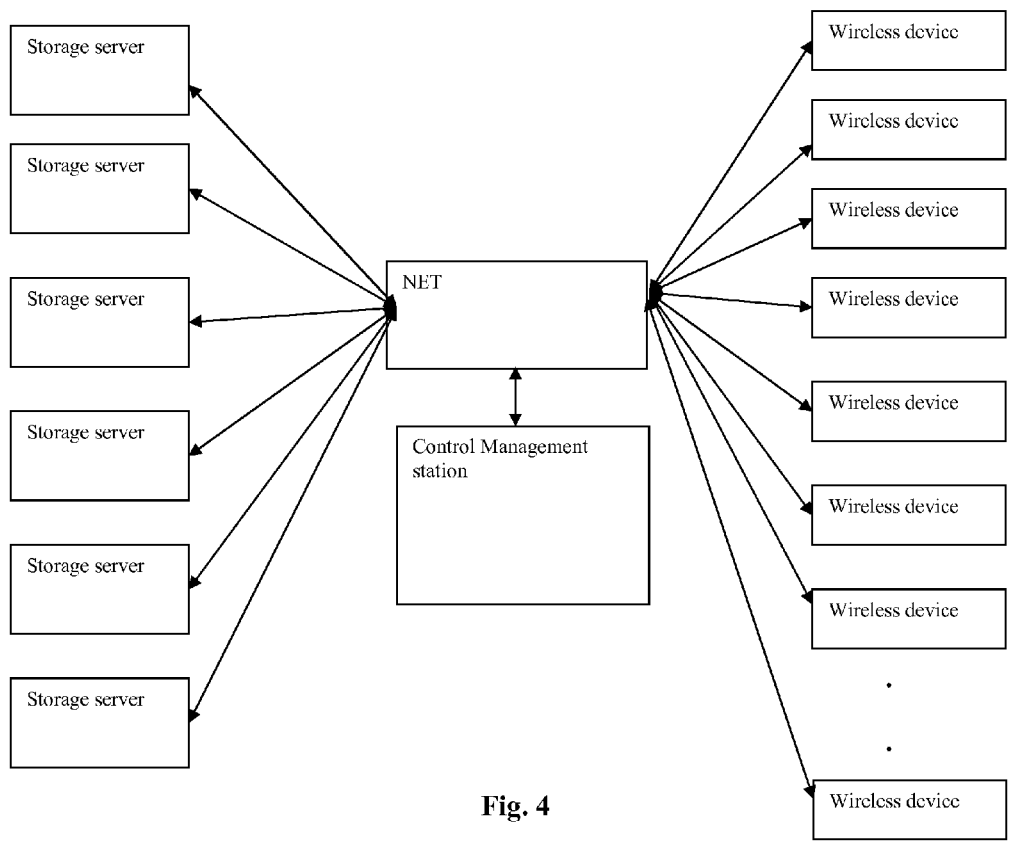
FIG. 4 is the same figure as the FIG. 1 of a prior application of "IP Based Distributed Virtual SAN" with an exception that each IP storage server provides file system as external storage for each of the wireless devices instead of providing IP based virtual SAN service. Also, each host in the FIG. 1 now actually is a wireless device in the FIG. 4.

The FIG. 3 has demonstrated that a user from a web-browser (8) on a wireless device (1) can download data from a known web-site (15) to his/her assigned external storage (10) on the server (3). The dash-lined path (a) represents a communication link between the wireless device (1) and a remote web-site (15) that provides downloading contents. The dash-lined path (b) represents a communication link between the wireless devices (1) and the storage server (3). The dash-lined path (c) represents a communication link between the server 3 and the remote web-server (15).

THE DETAILED DESCRIPTION OF THE INVENTION

The Use of the External Storage by the Wireless Device:

The FIG. 2 shows a simplified diagram of the wireless devices (1) using the external storage system (10) of the server (3) for effectively resolving the storage limitation problem for the wireless devices (1).

Partition storage volumes (FIG. 2):

With this invention, the entire storage (10) on the server (3) needs to be partitioned into suitable size of volumes (11) such as 4 GB for each volume. This will allow the server 3 to serve maximum number of the wireless devices (1). With the web console support software (5) of the server (3), tasks of partitioning the storage system (10) can be done through a web-console (13) on a console host (12) by an administrative staff.

In order to support storage partition, first the console support software (5) of the server (3) must send storage information of the server (3) to the web-console (13) of the console host (12). The storage information includes each storage device's name and total size etc. without limits. Second, based on the received storage information, the administration staff on the console host (12), for example, can use a web-console (13) to partition each storage device and send the storage partition information for the storage device to the console support software (5) of the server (3). The storage partition information includes the number of the partitions (volumes) and the size of each partition (volume). Third, upon receiving the storage partition information from the web-console (13) of the console host (12), the console support software (5) of the server (3) performs the actual storage partition by dividing the entire storage into multiple small volumes. Finally, for each small storage volume, a corresponding file system could be built up.

Assign storage volumes (FIG. 2):

Each of the storage volumes (11) together with its corresponding file system on the storage system (10) of the server (3) needs to be exclusively assigned to a user of a specific wireless device (1) by the console support software (5) of the server (3).

Data and storage volume management (FIG. 2):

With the support of the console support software modules (5) of the server (3) by following similar steps of said partitioning storage, the user of the wireless device (1) can utilize a web-browser 8 illustrated in FIG. 2 to setup folder or directory structure on the file system of his/her an assigned external storage volume (11). In addition, the user of the wireless device (1) can use the web-browser 8 performing all data management operations such as delete, copy, move, or rename for file or folder on the file system.

In order to support such data management over the external storage (10) assigned to the user of the wireless device (1) by using the web-browser 8, first the console support software modules (5) of the server (3) must communicate with the web-browser (8) of the wireless device (1) to present the assigned storage to a user as described before. Therefore, the user from the web-browser (8) of the wireless device (1) can choose a desired data management operation and perform an operation causing the operation information to be sent to the console support software modules (5) of the server (3). The mentioned operation includes establishing folder or directory; copying, moving, or reaming data file etc. for the folder or directory. Second, upon receiving the data management operation, the console support software modules (5) of the server (3) actually performs these requested operations on the assigned file system of an assigned external storage volume (11) on the server (3).

Store data from wireless device into external storage (FIG. 2):

To store the data such as digital photo pictures or messages into the file system on the assigned storage volume (11) in the server (3), the other software modules (9) of the wireless device (1) need to send these data to the other service modules (7) of the server (3) via communication link between them. Upon receiving the data, the other service modules (7) of the server (3) write these data to the file system of the assigned storage volume (11) on the server 3 for the wireless device 1. The protocol used between these two communication entities could be either IP or non-IP based protocol.

Download data from a remote web server site into allocated storage volume:

Now, referring to the FIG. 3, If a user of the wireless device (1) wants to download a data from a remote web server (15) into the file system on the assigned storage volume (11) in the external storage system (10) on the server (3), the following steps are required:

1) The user of the wireless device (1) via a web-browser (8) access to a remote web server site (15) to obtain information of the data for the downloading via the path (a) of the FIG. 3. For example, the user access to a web-page which contains the data name for the downloading and also contains IP address of the remote web site.

2) The other software modules (9) of the wireless device (1) obtain the downloading information for the data, which becomes available in the cached web-pages on the wireless device (1) after the web-browser (8) access to the web site (15).

3) The other software modules (9) of the wireless device (1) send the obtained downloading information to other service modules (7) of the storage server (3) via the path (b) of the FIG. 3.

4) Upon receiving the downloading information from the wireless device (1), the other service module (7) of the storage server (3) sends a web download request to the web-site (15) via the path (c) of the FIG. 3 based on download information obtained, and then receives the downloading data from the web server of the web-site (15).

5) Upon receiving downloading data streams, the other service modules (7) of the storage server (3) write the data into the file system on the assigned storage volume (11) in the server (3) for the wireless device (1).

Retrieve data from assigned storage volume for the user of the wireless device:

1) If a web-browser (8) on a wireless device 1 has embedded video or music functionality, a user of the wireless device (1) can use the browser to retrieve and play multimedia data file such as video or music stored in the assigned storage volume (11) located on the server (3).

2) In another embodiment, in respect to the user's needs, the other software module (9) of the wireless device (1) also can retrieve data file from the file system of the assigned storage volume (11) on the server (3).

Support external storage for a large number of the wireless devices:

If there is a need to provide each user a 2 GB of storage space, then a 160 GB disk drive can support 80 users. A 4096 GB (4 Tera Bytes) storage system on the server unit can support 2024 user. Each of the server units only can efficiently support a limited size of the storage system. In order to support a large number of the wireless devices, such as for 500,000 wireless devices, a larger number of the servers is required, in this case 250 servers is required. In order to let a larger number of the servers to effectively support the larger number of the wireless devices, an infrastructure like the CCDSVM is desirable, which has been described in prior patent applications. With the CCDSVM the control management system can control larger number of storage servers to provide external storage for a huge number of the wireless devices.

The invention claimed is:

1. A server for delivering storage service, comprising:
    a plurality of storage spaces; and
    a non-transitory computer-readable medium comprising program instructions that, being executed by the server, causes the server delivering the storage service; wherein the program instructions comprise:
    program instructions for allocating exclusively a first one of the storage spaces to a user of a first wireless device;
    program instructions for establishing a communication link for the first wireless device remotely access to the first one of the storage spaces;
    program instructions for presenting the first one of the storage spaces to the user on the first wireless device through communication with the first wireless device; and
    program instructions for updating the first one of the storage spaces according to a requested operation for remotely access to the first one of the storage spaces in response to the user from the first wireless device performing the operation,
    wherein said operation comprises storing data into the first one of the storage spaces or retrieving data therefrom,
        the storing of said data including to download a file from a remote server across a network into the first one of the storage spaces through utilizing download information for the file cached in the first wireless device in response to the user from the first wireless device performing the operation for downloading the file.

2. The server as recited in claim 1, wherein said downloading a file from a remote server further comprises:
    the first wireless device obtaining downloading information for the file from the remote server, transmitting the cached downloading information to the server, and causing the server in accordance with the downloading information to download the file into the first one of the storage spaces.

3. The server as recited in claim 1, wherein said storage spaces further are configured among a plurality of storage devices.

4. The server as recited in claim 1, wherein the data being stored into or retrieved from the first one of the storage spaces, further is a message or multimedia data of video, digital music, or digital picture.

5. The server as recited in claim 1, wherein said operation further comprises:
    from the first wireless device remotely deleting, moving, copying or renaming a folder in the first one of the storage spaces.

6. The server as recited in claim 5, wherein said operation further comprises:
    from the first wireless device remotely deleting, moving, copying or renaming a file in the first one of the storage spaces.

7. The server as recited in claim 1, wherein said operation further comprises:
    from the first wireless device remotely creating a folder or a folder structure in the first one of the storage spaces.

8. The server as recited in claim 1, wherein said program instructions further configures the server to cause display of the first one of the storage spaces in a web browser executed on the first wireless device for the user remotely access to the first one of the storage spaces.

9. The server as recited in claim 1, wherein the program instructions further causes the server to allocate exclusively a second one of the storage spaces of a predefined capacity to a user of a second wireless device for facilitating the user remotely access to the second one of the storage spaces.

10. The server as recited in claim 1, wherein the first wireless device further is one of a cell phone or a personal data assistant and management device ("PDA").

11. The server as recited in claim 1, wherein the download information for the file further includes at least the name of the file and the internet protocol ("IP") address of the remote server.

12. A server for delivering storage service, comprising:
a plurality of storage spaces, and a non-transitory computer-readable medium comprising program instructions that, executed by the server, causes the server to deliver the storage service; wherein the program instructions comprises:
program instructions for the server allocating exclusively a first one of the storage spaces of a predefined capacity to a user of a first wireless device;
program instructions for establishing a communication link for the first wireless device remotely access to the first one of the storage spaces;
program instructions for sending information of the first one of the storage spaces to the first wireless device for presenting the first one of the storage spaces to the user; and
program instructions for updating the first one of the storage spaces according to a requested operation for remotely access to the first one of the storage spaces in response to the user from the first wireless device performing the operation,
wherein said operation comprises creating from the first wireless device a folder structure of a plurality of folders in the first one of the storage spaces, and comprises to delete or move or copy or rename a first one of the folders in the folder structure, wherein each of the folders being used by the first wireless device for storing data therein or retrieving data therefrom.

13. The server as recited in claim 12, wherein said storing data includes to download a file from a remote server across a network into the first one of the storage spaces through utilizing download information for the file cached in the first wireless device in response to the user from the first wireless device performing the operation for downloading the file.

14. The server as recited in claim 13, wherein said downloading a file comprises: the first wireless device obtaining download information for the file from the remote server, transmitting the cached download information to the server; and causing the server in accordance with the downloading information to store the file from the remote server into the first one of the storage spaces.

15. The server as recited in claim 12, wherein said operation further comprises: from the first wireless device to create a folder in the folder structure.

16. The server as recited in claim 12, wherein said data being stored into or retrieved from the first one of the storage spaces, further comprises a message, or a multimedia data of video, digital music or photo picture.

17. The server as recited in claim 12, wherein said operation further comprises: from the first wireless device to delete, move, copy or rename a file in the folder structure.

18. The server as recited in claim 12 wherein said storage spaces further are configured among a plurality of storage devices.

19. The server as recited in claim 13, wherein said download information for the file further includes at least the name of the file and the internet protocol ("IP") address of the remote server.

20. The server as recited in claim 12, wherein the program instructions further causes the server to: allocate exclusively a second one of the storage spaces of a predefined capacity to a user of a second wireless device for facilitating the user remotely access to the second one of the storage spaces.

* * * * *